(12) United States Patent
Brendle et al.

(10) Patent No.: US 7,685,568 B2
(45) Date of Patent: Mar. 23, 2010

(54) SERVICE MANAGEMENT OF A SERVICE ORIENTED BUSINESS FRAMEWORK

(75) Inventors: Rainer Brendle, Neckargemuend (DE); Frank Brunswig, Heidelberg (DE); Josef Dietl, Nussloch (DE); Rolf Krane, Wiesloch (DE); Juergen Remmel, Muehlhausen (DE); Stephan Ritter, Saarbruecken (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 1187 days.

(21) Appl. No.: 10/747,018

(22) Filed: Dec. 23, 2003

(65) Prior Publication Data

US 2005/0022163 A1    Jan. 27, 2005

Related U.S. Application Data

(60) Provisional application No. 60/489,573, filed on Jul. 22, 2003.

(51) Int. Cl.
*G06F 9/44* (2006.01)
(52) U.S. Cl. .................................................. 717/120
(58) Field of Classification Search ......... 717/106–113, 717/124–128, 120–121
See application file for complete search history.

(56) References Cited

U.S. PATENT DOCUMENTS

| | | | |
|---|---|---|---|
| 5,557,793 A | 9/1996 | Koerber | |
| 5,644,764 A | 7/1997 | Johnson et al. | |
| 5,758,348 A | 5/1998 | Neubauer | |
| 5,845,289 A | 12/1998 | Baumeister et al. | |
| 5,875,333 A | 2/1999 | Fish et al. | |
| 5,960,410 A | 9/1999 | Halpern | |
| 5,977,967 A | 11/1999 | Berner et al. | |
| 6,349,404 B1 | 2/2002 | Moore et al. | |
| 6,407,761 B1 | 6/2002 | Ching et al. | |
| 6,665,674 B1 * | 12/2003 | Buchanan et al. | 707/10 |
| 7,089,543 B2 * | 8/2006 | Rising, III | 717/144 |

FOREIGN PATENT DOCUMENTS

| | | |
|---|---|---|
| EP | 0 809 198 A2 | 11/1997 |
| EP | 1 081 609 A2 | 3/2001 |
| JP | 10-069410 | 3/1998 |
| WO | WO 02/37335 A2 | 5/2002 |

OTHER PUBLICATIONS

Fielding et al, "Hypertext Transfer Protocol—HTTP/1.1", Jun. 1999, Network Working Group, pp. 1-176.*
Paolucci et al., "Semantic Matching of Web Services Capabilities", 2002, CiteSeer, Proceedings of the First International Semantic Web Conference on The Semantic Web, pp. 333-347.*
Goland et al, "HTTP Extensions for Distributed Authoring—WEBDAV", Feb. 1999, Network Working Group, pp. 1-94.*
www.t11.org, "Lock Manager 0.4", Aug. 2000, retrieved from http://www.t11.org/ftp/t11/member/fc/gs-3/00-476v0.pdf, pp. 1-12.*
http://www.jcp.org/en/jsr/detail?id=227; The Java Community Process(SM) Program—JSRs: Java Specifications Request—details JSR# 227 (pp. 1-9) (Jul. 2003).

* cited by examiner

*Primary Examiner*—Ted T Vo
(74) *Attorney, Agent, or Firm*—Finnegan, Henderson, Farabow, Garrett & Dunner, LLP

(57) ABSTRACT

Methods and apparatus, including computer program products, for providing services by an application server, the method including collecting a request from a consumer software component for a service from a provider software component, and checking the request against a set of semantic descriptions in a manifest of methods provided by objects in the provider software component.

16 Claims, 6 Drawing Sheets

SERVICE MANAGEMENT OF A SERVICE ORIENTED BUSINESS FRAMEWORK

CROSS-REFERENCE TO RELATED APPLICATIONS

This application claims the benefit of the filing date of U.S. Provisional Application No. 60/489,573 for ENTERPRISE SERVICES FRAMEWORK TECHNOLOGIES, filed Jul. 22, 2003, the disclosure of which is incorporated by reference in its entirety.

BACKGROUND

The present invention relates to data processing by digital computer, and more particularly to service management of a service-oriented business framework. The present invention relates to data processing by digital computer, and more particularly to self describing business objects.

Large scale business software applications are sometimes categorized in terms of a "front end component" that includes a graphical user interface (GUI) to present data to users and accept data entry from users. Such front end components are customized for specific customers. Another component of such software applications is sometimes referred to as a "back end component" that stores business data and processes the business data according to business logic. The back end component retrieves, generates, and maintains the business data. The back end component is usually responsible for the consistency and correctness of the data. The back end component also can store relationships between the various data. In a typical business software application, the front end component includes application code to display and aggregate data of the back end and provides help to generate requests to the back end for update operations.

The data of the back end can be represented using relational database terminology. In relational database terminology, an entity is a record and an entity type is a set of entities with common attributes to which a unique name and a unique description are assigned. Typically, a database has multiple two dimensional tables where each table represents an entity type and each row in each table represents an entity. An attribute is a description of a characteristic of an entity or entity type. Typically, an attribute is specified in a field or a column in a database table. Entity types can also have relationships that enable linking one or more entities of an entity type to other entities of another entity type. This linking can be done using foreign keys by having one or more fields in one table pointing to a primary key of a second table. This enables traversing from a set of entities in one table to related entities in another table.

SUMMARY OF THE INVENTION

In one aspect, the invention features a method for providing services by an application server, the method including collecting a request from a consumer software component for a service from a provider software component, and checking the request against a set of semantic descriptions in a manifest of methods provided by objects in the provider software component.

Embodiments may include one or more of the following. The manifest is derived from a repository of descriptions of the objects in a database. The method further includes executing one or more methods provided by an object in the provider software component and combining results of the one or more methods based on a match of the software request with a semantic description of one or more methods and the object in the repository. In some cases, the method also includes adding tracing functionality to the execution of the one or more methods provided by the object in the provider software component for software debugging. The method includes collecting one or more messages sent by the one or more methods provided by the object in the provider software component during execution. The method also includes preventing the object in the provided software component from executing the one or more methods for a second consumer software component until a transaction with the first consumer software component is completed.

In one aspect, the invention features a system including a first computer configured to execute a client program, a second computer configured to execute a server program, and a network linking the first and second computers such that the server program is configured to execute the following. Collect a request from the client program for a service from the server program, and check the request against a set of semantic descriptions in a manifest of methods provided by objects provided by the server program.

Embodiments may include one or more of the following. The manifest is derived from a repository of descriptions of the objects in a database. The server program is further configured to execute the following: execute one or more methods provided by an object in the server program and combine results of the one or more methods based on a match of the software request with a semantic description of one or more methods and the object in the repository. The server program is further configured to add tracing functionality to the execution of the one or more methods provided by the object provided by the server program for software debugging. The server program is further configured to collect one or more messages sent by the one or more methods provided by the object in the server program during execution. The server program is further configured to prevent the object provided by the server program from executing the one or more methods for a second client program until a transaction with the first client program is completed.

These and other embodiments may have one or more of the following advantages. Externally offered services by an application server in a service-based architecture can be flexibly constructed out of application server components and decorated by various extra functionalities by the application server in a consistent manner. This allows many functionalities to be offered in a consistent way across various application components. Cross cutting functionalities like transaction and concurrency management, tracing and debugging, and error handling can be done by generic code from the application server that is provided independently from the application code. New and better adapted services can be constructed out of a repository model without additional coding from the elementary methods provided by the application server components.

The details of one or more implementations of the invention are set forth in the accompanying drawings and the description below. Further features and advantages of the invention will become apparent from the description, the drawings, and the claims.

DETAILED DESCRIPTION

Figure 1:
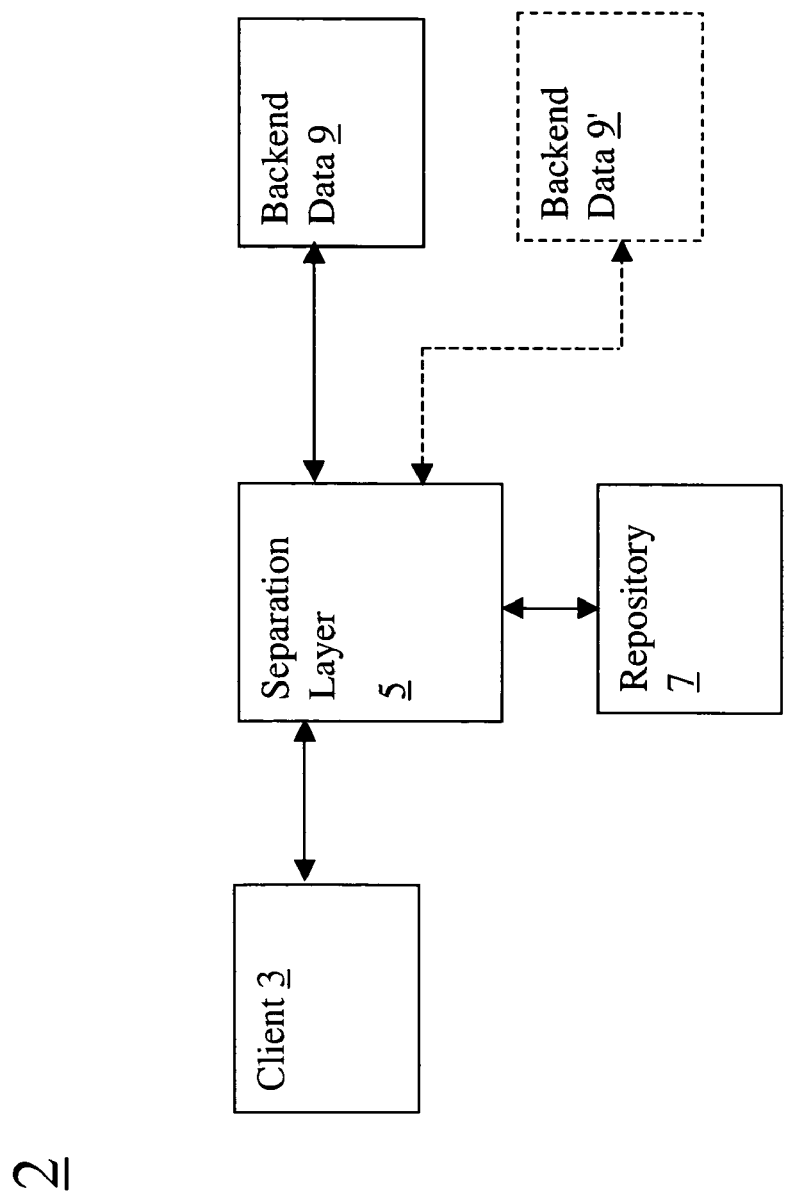
FIG. 1 is a block diagram of an example logical representation of a business software application.

FIG. 1 illustrates an overview logical representation of a business software architecture 2, which includes a client 3, a separation layer 5, a repository 7 and backend data 9 and 9'. Client 3 provides a user interface (UI) that enables a user to interact with the backend data 9 and/or 9'. Backend data 9 and 9' can be associated with different backend applications and/or can be arranged and formatted differently from each other. Separation layer 5 separates the front end user interface provided by client 3 from the back end data 9 and 9'. This separation enables client 3 to interact with backend data 9 and 9' in a consistent and similar manner, regardless of the formatting or application-associated differences between backend data 9 and 9'. In other words, separation layer 5 provides a canonical interface to backend data 9 and 9' so that client 3 is configured to interact with separation layer 5 and only needs to be updated if separation layer 5 changes. Changes to backend data 9 and 9' do not necessitate an update to client 3. Further, separation layer 5 is scalable and configured to handle changes and growth to backend data 9 and 9' and any other disparate backend data and backend services that are further connected to separation layer 5.

As described in more detail below, separation layer 5 is based on a meta model that defines how backend data (e.g., 9 and 9') are represented in separation layer 5. Meta data is stored in repository 7 that describes how the backend data 9 and 9' fit into the meta model representation. Client 3 interacts with backend data 9 and 9' using a generic command set defined by separation layer 5. As described in more detail below, separation layer 5 accesses service providers that perform the generic commands from client 3, using the meta data in repository 7, to effect the requested manipulation of backend data 9 and 9'. The service providers are configurable so that different service providers can be used for different backend data 9 and 9'. Separation layer 5 includes an interface (e.g., a service manager) that hides the characteristics of the corresponding backend data 9 and 9' and also the granularity and distribution of the implementation (i.e., the service providers).

Figure 2:
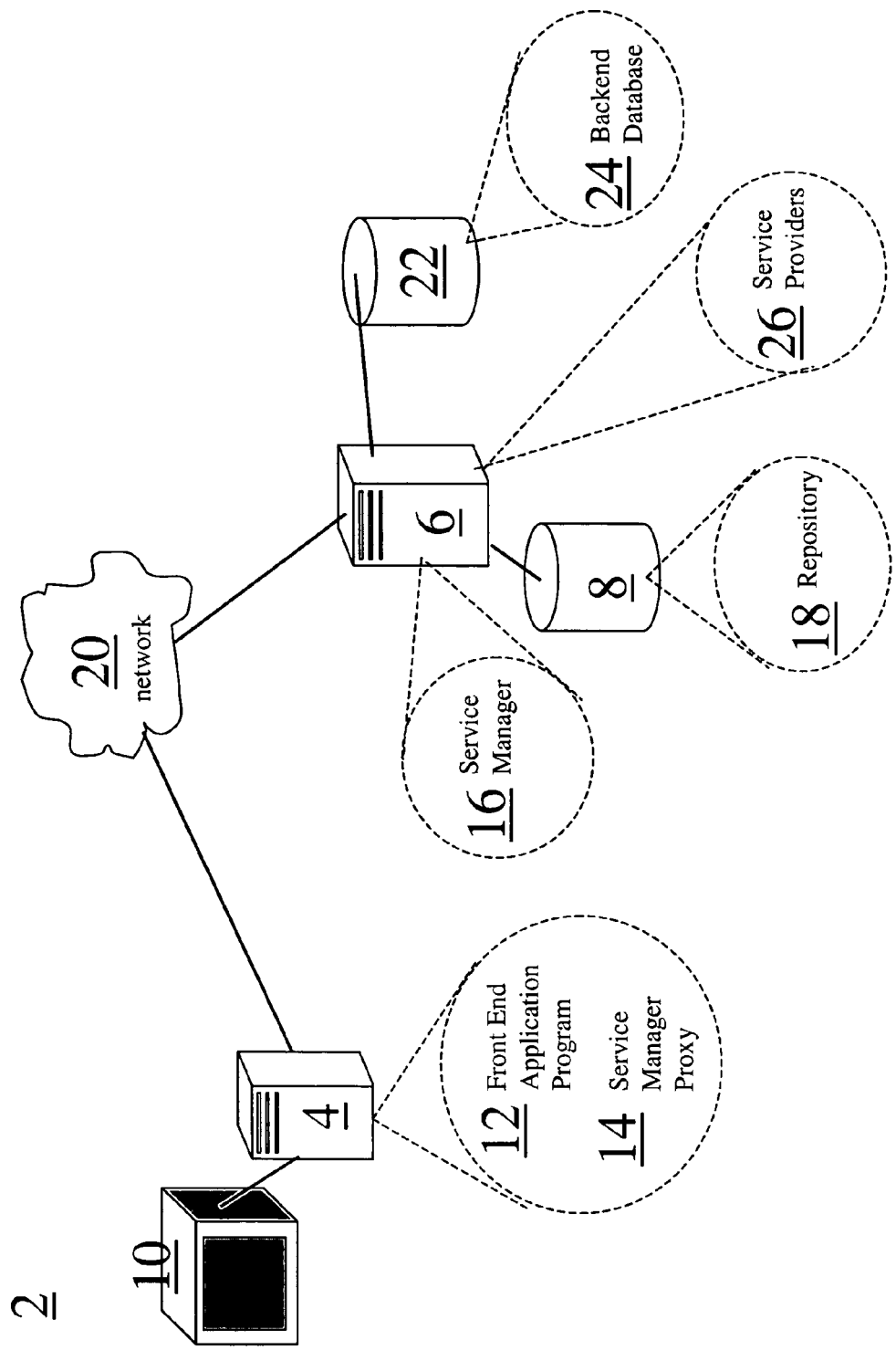
FIG. 2 is a view of a network configuration for a business software application.

FIG. 2 illustrates an example implementation of the business software architecture 2. As shown in FIG. 2, the business software architecture 2 includes a first computer 4 and a second computer 6. The computers 4 and 6 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 4 and 6 can be preprogrammed, in ROM, for example, or the computers 4, 6 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 20 connects computers 4 and 6. The network 20 is any form or medium of digital data communication, e.g., a communication network. Examples of communication network 20 include a local area network ("LAN") and a wide area network ("WAN"), e.g., the Internet.

Computer 4 executes instructions of a front end application program 12. Application program 12 represents a front end component of the business software architecture 2. Service manager 16, running on computer 6, is a service layer between the front end application program 12 and a set of back end service providers 26. Service manager 16 provides a service interface to front end application program 12 to enable indirect interaction with the set of back end service providers 26 running on computer 6. This service interface allows for a partial separation of software development for front end application program 12 and the set of back end service providers 26.

Computer 6 includes a data storage device 22 that stores a back end database 24 containing data that can be used by the set of back end service providers 26. Computer 6 also includes a data storage device 8 containing an information repository 18 that defines and describes the services provided by the set of back end service providers 26. The meta data in repository 18 is organized according to a meta model.

In general, a meta model is a collection of "concepts" that are the vocabulary with which a certain domain can be described. Meta models typically are built according to a strict rule set, which in most cases is derived from entity-relationship-attribute or object-oriented modeling. The front end application program 12 can access (and interpret according to the strict rule set) the contents of repository 18 via the service manager 16. These services support the functionality of application program 12 and include retrieving and reading data in addition to modifying stored data. The service providers 26 can access or modify stored data in backend database 24 to provide services to front end application program 12. To provide the services, the set of back end service providers 26, upon request from the front end application program 12, either access or modify stored data in backend database 24 or calculate new data.

The repository 18 defines a syntax for requesting services provided by the set of back end service providers 26 and semantically describes the services. As front end application program 12 executes, front end application program 12 can use this syntax and semantic description from the repository 18 (accessed through the service manager 16) to determine what services front end application program 12 can use to meet its requirements. This syntax and semantic description for stored or computed backend data can be referred to as "meta data". This stored or computed backend data is conceptually organized using object-oriented terminology in terms of business objects, where each business object is an instance of a class or data entity type. In one example, a class of business objects refers to a relational database table where each row of data in the table represents the data for a particular business object. In this example, each field in the table represents an attribute of the business object class. In another example, there is a class of business objects that partially refers to a relational database table such that some of the fields in the table represent attributes of the business object class and other fields are computed upon request.

In the business software architecture 2, services provided to front end application program 12 are focused on data (i.e., data-centric) so the description of these services in repository 18 is also data-centric. Thus, the meta data in repository 18 is structured around representations of classes of these business objects. This meta data includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of backend service providers 26 on instances of these aspects.

Classifications of data, relations between data classes, prebuilt queries for accessing data, and other descriptions of data provided by the set of backend service providers 26 are represented by repository 18. This representation, or meta data, of data (e.g., stored in backend database 24) provided by the set of backend service providers 26 describes different abstract types or classes of data in backend database 24 and how different data classes relate to each other. Objects are instances of these different abstract types. Meta data is information about data rather than content of the data. The meta data also defines a set of pre-built queries that can be executed on the data in database 24.

The semantic description in repository 18 can enable front end application program 12 to determine which services to request from service manager 16. These services often take the form of requesting data to display. Front end application program 12 reads the meta data in repository 18 and can flexibly request data organized in different ways that are specified by the meta data. For example, two service managers 16 with two different repositories 18 handle services that determine prices of books for companies A and B. For A and B, book prices are represented by different aspects with different data fields. Front end application program 12 reads A's repository 18 to obtain descriptions of data (including a price) concerning a particular book from A's service providers 26. Front end application program 12 reads B's repository 18 to obtain descriptions of data (including a price) concerning a particular book from B's service providers 26. Front end application program 12 is able to request and display the information from A's service provider 26 and the information organized differently from B's service provider 26 to present the book price information to a user.

For requesting the services described by the semantic description in repository 18, service manager 16 provides a canonical interface for services on the business objects in the backend. This canonical interface includes a set of standard operations on the business objects. Such standard operations on the business objects include select, insert, update, delete, select by relation, and update fields. These standard operations are intended to be easy to understand and use. The usage of these standard operations is understood through the strict rule set of the meta model of the repository 18. Furthermore, the repository 18 also includes documented modeling of the side effects of the usage of the operations. The side effects for an operation model which stored business objects are affected by executing the method. For example, "delete" usually has a side effect on other stored business objects related to the deleted object. Other standard operations perform more specialized tasks and support functionality for transactions between front end application program 12 and service manager 16 (e.g., a lock operation).

The canonical interface provided by the service manager 16 also includes specialized actions that are defined for specific classes of business objects and queries that can be defined for clusters of classes of business objects. The clusters are modeled as service modules (described in more detail below) in the meta data. These actions and queries are also defined in the meta data of the repository 18.

During execution, front end application program 12 issues service requests to service manager 16, service manager 16 checks the requests for consistency with the meta data in repository 18, and then the service manager 16 passes the requests to back end service providers 26 according to the meta data in the repository database 18. The manner of implementing the set of back end service providers 26 and data in database 24 is independent of application 12, with back end service providers 26 and data in database 24 conforming to the definitions and descriptions of the meta data in the repository 18. Database 24 can be a relational database. However, database 24 can be modified to use a different mode of data organization other than a relational database and front end application program 12 does not need to be modified if back end service providers 26 and data in database 24 still conform to the meta data in the repository 18. One such different mode of data organization for database 24 can be an object-oriented database.

Front end application program 12 provides user interfaces displayed on monitor 10. Front end application program 12 provides application code to display and aggregate the data received from the set of backend service providers 26. Front end application program 12 generates requests, via service manager 16, to the set of backend service providers 26 for standard operations such as select, insert, update, delete, and execute, in addition to more specialized operations. Front end application program 12 is interaction-centric, focused on aggregating data of the back end service providers 26 and combining interactive steps into a flow of screens and syndicated screen elements.

Front end application program 12 contains screen-flow logic of User Interface (UI) oriented applications and front end application program 12 binds a UI to the meta data in repository 18. Front end application program 12 can be indirectly bound to a specific set of backend services by back end service providers 26 via descriptions of the services in the metadata of the repository 18. Front end application program 12 can also be formed from various generic interaction-centric front-end layers that are only bound by configuration to a highly standardized service layer by service manager 16 serving as an intermediary to back end service providers 26.

In some implementations, a service manager proxy 14 gives the front end application program 12 a buffered access to a service interface provided by service manager 16. Service manager proxy 14 is a server on computer 4 that acts as an intermediary between the front end application program 12 and the service manager 16 so that the business software architecture 2 can ensure security, administrative control, and caching service. The service manager 16 offers a queuing functionality, which is used by the front end application program 12 to bundle several service requests or commands (resulting in service methods) into a single service method queue in order to save round trips. Service manager proxy 14 allows front end application program 12 and service manager 16 to be separated onto different computers 4, 6. Furthermore, use of service manager proxy 14 can allow service manager 16 and the set of backend service providers 26 to be distributed over multiple computers.

In one example, the service manager proxy 14 communicates with service manager 16 using SOAP (Simple Object Access Protocol) messages via network 20. SOAP is a way for a program running in one kind of operating system (such as a Windows® XP Operating system available from Microsoft Corporation of Redmond, Wash.) to communicate with a program in the same or another kind of an operating system (such as Linux) by using the World Wide Web's Hypertext Transfer Protocol (HTTP) and Extensible Markup Language (XML) as mechanisms for information exchange. Since Web protocols are installed and available for use by all major operating system platforms, HTTP and XML provide a solution to a problem of how programs running under different operating systems in a network can communicate with each other. SOAP specifies exactly how to encode an HTTP header and an XML file so that a program in one computer can call and pass information to a program in another computer. SOAP also specifies how the called program can return a response.

Figure 3:
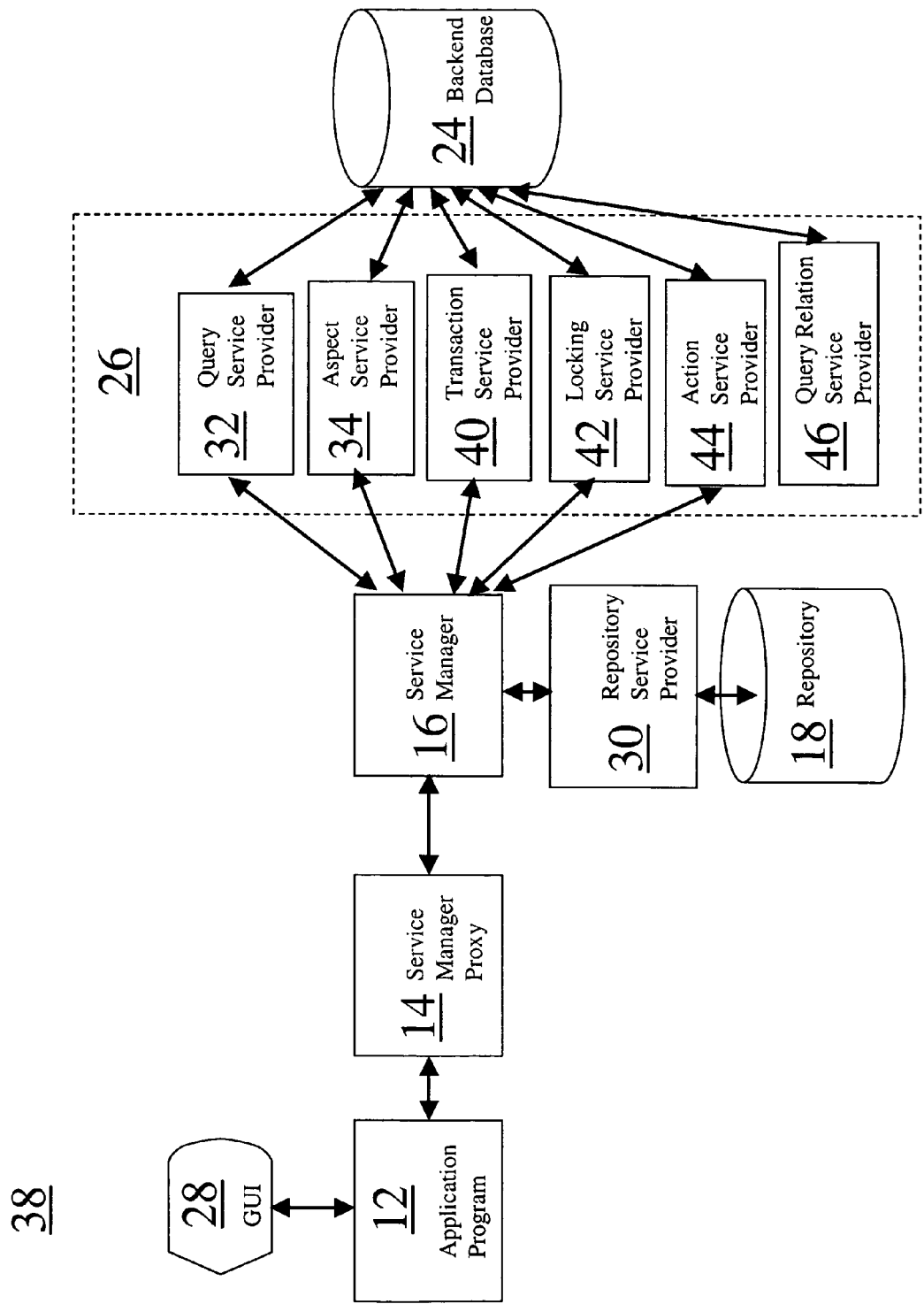
FIG. 3 is a block diagram of the business software application of FIG. 1.

As shown in FIG. 3, the service manager 16 provides an interface (defined by the meta data in repository 18) to front end application program 12 that hides the characteristics of the corresponding back end service providers from the set of backend service providers 26 and data in database 24. Front end application 12 uses this interface to retrieve data from backend database 24 to display in graphical user interface (GUI) 28 for interaction with a user.

The service manager 16 provides the interface to front end application program 12 by receiving and executing requests from front end application program 12 to backend service providers 26. After each receipt of a request by the service manager 16, the service manager 16 delegates the request to one or more service providers 30, 32, 34, 40, 42, 44, and 46. Service provider 30 is an instance of a software class repository service provider. Service providers 32, 34, 40, 42, 44, and 46 represent instances of software classes such as query service provider class (32), aspect service provider class (34), transaction service provider class (40), locking service provider class (42), action service provider class (44), and query relation service provider class (46). The software classes for service providers 32, 34, 40, 42, 44, and 46 can be implemented as ABAP global classes maintained by the ABAP class library using the ABAP development environment available from SAP of Walldorf, Germany. They also can be implemented by any other programming language on any other platform, e.g., Java on Linux or C# on Windows.

Repository service provider 30 handles requests to get or modify meta data from repository 18. Query service provider 32 handles queries on data in backend database 24 from front end application program 12. Aspect service provider 34 handles accessing and modifying data, navigation through relations, and calling actions. The aspect service provider 34 has a standard set of methods that correspond to the standard operations on aspects that can be requested from the service manager 16. These standard operations include select, insert, update, delete, select by relation, and update fields. Transaction service provider 40 allows business logic to act on different states of a transaction between front end application program 12 and service providers 26. Locking service provider 42 enables separation of concurrent accesses on data types in backend database 24; Action service provider 44 enables execution of actions on aspects. Query relation service provider 46 is the interface for the target aspect of a relation. In some examples, service manager 16 can have different multiple instances of service providers 32, 34, 40, 42, 44, and 46 for different elements in repository 18 representing services. Upon receiving a request for a service represented by an element in repository 18, the service manager 16 can look up a name of a service provider (e.g., 32, 34, 40, 42, 44, and 46) in the meta data for the element in repository 18. For example, the meta data describing an aspect in repository 18 defines which aspect service provider 34 is designed to handle services for the aspect. The service manager 16 uses this information in the meta data to direct requests from the front end application program 12 to the appropriate aspect service provider 34. Similarly, the meta data describing a query in repository 18 defines which query service provider 32 is designed to handle services for the query.

The interface provided by the service manager 16 provides requests or commands to front end application program 12. As mentioned previously, standard commands select, insert, update, delete, select by relation, and update fields are standard operations on aspects in the repository 18. These standard operations are provided by aspect service provider 34 and correspond to some of the requests or commands available to front end application program 12. A "Select" command provides a capability such that if the identifiers (or keys) of instances of a data type (e.g., stored in database 24) provided by aspect service provider 34 are known, front end application program 12 can select and read the attributes of these instances. An "Insert" command allows front end application program 12 to add new instances of a data type (e.g., stored in database 24) provided by aspect service provider 34. A "Select By Relation" command provides a capability that if a data type is known, front end application program 12 can find other data types that have relations to this data type as defined in repository 18. An "Update" command provides a capability to modify instances of data types (e.g., stored in backend database 24) provided by aspect service provider 34. A "Delete" command provides the capability to delete one or more selected instances of one or more data types (e.g., stored in backend database 24) provided by aspect service provider 34.

An "Execute" action command provides a capability to execute a semantically defined action on one or more instances of one or more data types (e.g., stored in database 24) provided by aspect service provider 34. Either the aspect service provider 34 or the action service provider 44 executes the Execute action command. A "Query" command provides a capability to search and find particular data of interest. The Query command is a method with a fixed set of search parameters and a result set with a defined structure. Queries are defined for particular service modules, or clusters of aspects in the meta data of the repository 18. The query service provider 32 executes a Query command.

Figure 4:
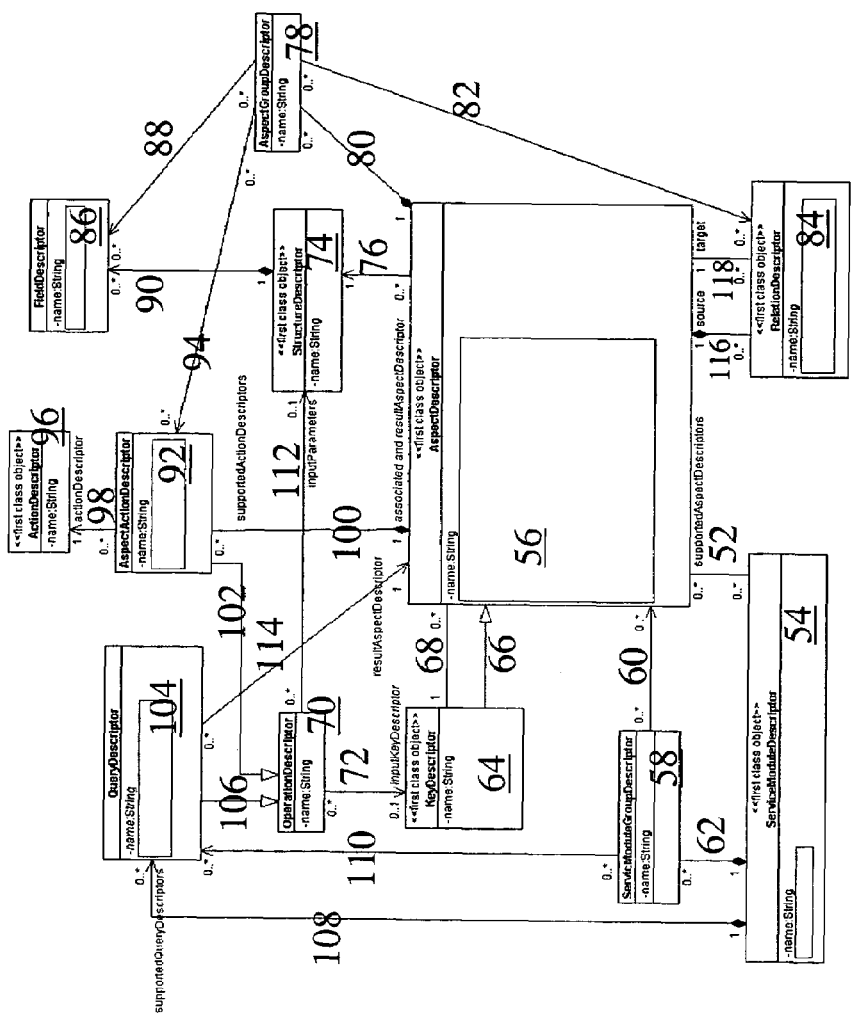
FIG. 4 is a Unified Modeling Language (UML) representation of a structure of a meta model repository.

The meta data in repository 18 is classified into data types or classes. The names of meta model classes representing the data type classifications in repository 18 have the suffix "descriptor" to express their belonging to the meta model and to differentiate them from runtime classes used by service manager 16. Descriptors of classes of the meta data of the repository 18 and their class relations are illustrated using an Unified Modeling Language (UML) class diagram 50 in FIG. 4.

Comparing the meta data to data described by relational database terminology, an aspect in the repository 18 can represent a class or an entity type fully or partially stored in backend database 24 and an aspect descriptor 56 includes attributes for the entity type in addition to other information about the entity type. The meta data in the repository 18 also can include relations descriptors 84 defining relations between aspects that can be implemented in database 24 as relationships using foreign keys in relational databases. The meta data also can include service modules descriptors 54 representing service modules that are aggregations of aspects and have predefined queries for accessing data in database 24.

The service modules defined in repository 18 are the building blocks for a set of applications (e.g., front end application program 12) in business software architecture 2 for a particular application area or industry. The service modules encapsulate the implementation and business logic and provide access to data and functionality in a unified canonical way. Examples for service modules in repository 18 are "business partner", "employee", "sales order", or "business activity". Service module descriptor 54 describes services modules in the data model of the meta data of the repository 18 and how the service modules can be accessed by queries from application program 12.

In repository 18, each defined query is an entry point to search instances of a data type (represented by an aspect) provided by service providers 26 via service manager 16. A "key" is an identifier of an instance of a data type provided by service providers 26. An "action" is a specialized method on one or more instances of an aspect. A "structure" is the aggregation of attributes representing the data of an aspect. A "relation" is the relation between objects of a source and a target aspect. A service module group is associated with a service module and is an aggregation of aspects, relations, and queries. An aspect group is associated with an aspect and is an aggregation of relations, aspect actions, and field descriptors 86. The meta data in the repository 18 also includes a text description of each aspect, query, key, action, structure, relation, service module group, and aspect group that is included in the available back end (e.g., backend database 24). So, the organization of the meta data in the repository 18 can be described in terms of those data types (e.g., aspect, query, key, action, structure, relation, service module group, and aspect group).

The data model for attributes of aspects, queries, keys, and actions is based on structure descriptors 74. In one example, every aspect has one structure descriptor 74 that defines the data attributes of the aspect. Structure descriptors 74 refer to a data dictionary in repository 18. A data dictionary is a collection of descriptions of the data objects or items in a data model for the benefit of programmers and others who need to refer to them. The structure descriptors 74 can be defined in an XML Schema or in one or more database tables in repository 18.

In one example, structure descriptors 74 defined in repository 18 include flat structures in database tables. A flat structure is a sequence of pairs of attribute names and field descriptors 86 of simple value types such as real, integer, character string, and boolean. For instance, a structure descriptor 74 defining a two dimensional point can be a list {X, real, Y, real}, where X and Y are attribute names having real values.

In one example, structure descriptors 74 defined in repository 18 include flat structures in database tables. A flat structure is a sequence of pairs of attribute names and field descriptors 86 of simple value types such as real, integer, character string, and boolean. For instance, a structure descriptor 74 defining a two dimensional point can be a list {X, real; Y, real}, where X and Y are attribute names having real values.

In another example of the repository 18, structure descriptors 74 can include nesting and collections of other structure descriptors 74. Nesting of other structure descriptors 74, or sub-structures, to enable the generation of larger aspects is useful whenever the use of keys for sub-structures defining smaller aspects does not make sense.

For front end application program 12 to access data (e.g., data stored in backend database 24) from service providers 26 through the service manager 16, instances of business object classes are identified by unique keys within a service module, for example the number of an order or the id of a product. To differentiate between different types of keys for different aspects in a service module, key descriptors 64 define different types of keys. A key descriptor 64 is associated with a structure descriptor 74 that can include more than one data attribute. In one example, every key has a character string attribute. A service module can be associated with different key descriptors 64 for different aspects, e.g., an order key may have another key descriptor 64 as an order item key.

Service module descriptor 54 includes a collection of aspect descriptors 56. An aspect descriptor 56 refers to one structure descriptor 74 and one key descriptor 64. The structure descriptor 74 includes all key attributes of the corresponding key descriptor 64. Key descriptors 64 are specialized aspect descriptors 56. The key descriptor 64 attribute of a key refers to itself as a self-reference. Examples for aspect descriptors 56 within a simple sales order service module can include: Order, Order Detail, Shipping Address, Billing Address, and Order Item as well as descriptors for key aspects like Order ID and Order Item Key. Service module descriptor 54 specifies the collection of supported aspect descriptors 56. Multiple service module descriptors 54 can be associated with the same aspect descriptor 56.

Aspect descriptors 56 relate to each other specified by relation descriptors 84. A relation descriptor 84 has one source aspect descriptor 56 and one target aspect descriptor 56. In this sense, relation descriptors 84 are directed. Relation descriptors 84 also have an optional cardinality (e.g., 1 . . . n) and a category. Supported categories are, for example, Parent-Child or Child-Parent.

A relation descriptor 84 defining a relation between source aspect A and target aspect B means that it is possible to traverse from instances of aspect A to instances of aspect B. For example, given that aspects A and B are implemented in backend database 24 as relational database tables, this means that one or more fields in a table corresponding to aspect A point to the primary key of a table corresponding to aspect B. The relation descriptor 84 defining a Parent-Child relation from source aspect A and target aspect B means that aspect B depends on the existence of aspect A. For example, given that aspects A and B are implemented in backend database 24 as relational database tables, this means that a primary key of a table corresponding to aspect B is derived from a table corresponding to aspect A. Relation descriptors 84 are introduced to describe internal navigation from one aspect to another within the same service module, e.g., from an order to the shipping address (cardinality 1 . . . 1) or to the order items (cardinality 1 . . . n) within a sales order service module. Relation descriptors 84 are independent of service modules and can be reused by different service modules. For an internal navigation or traversal from one data type to another in backend database 24, the visible (usable) relation descriptors of a source aspect descriptor 56 are defined by the service module descriptor 54, which has a list of supported relation descriptors 84. Navigation is allowed for those supported relation descriptors 84 that have a target aspect descriptor 56 that is also supported by the service module descriptor 54.

Operations for accessing and acting on data types in backend database 24 are described in operation descriptors 70. The structure descriptor 74 defines input parameters of the operation descriptor 70. This structure descriptor 70 also includes an input key descriptor 64 that enables mass and filter operations. Mass operations are operations specified by front end application program 12 on multiple instances of a data type in backend database 24. Filter operations filter the results of an operations, e.g., a query, by the keys defined by the input key descriptor. Input parameters for operation descriptors 70 are optional.

There are three types of operation descriptors 70 i.e., query descriptors 104, aspect action descriptors 92, and action descriptors 96. The aforementioned commands Query and Execute action are defined by operation descriptors 70.

Query descriptors 104 describe query methods that allow searching for instances of aspects within a service module. The query descriptor 104 includes an input parameter, an input key descriptor 64, and a result aspect descriptor 56. The input parameter is a structure descriptor 74 that defines the search parameter structure of the query. The input key descriptor 64 defines which keys may be used for filtering. For example, executing a query defined by a query descriptor 104 with filtering keys results in a list of keys meeting the criteria of the first input. This list of keys is filtered by the set of filtering keys of the input key descriptor 64 so that a subset of the list of keys can be returned. The result aspect descriptor 56 for the query descriptor 104 specifies the type of result of the query, which could be any aspect descriptor 56 that is associated with the service module.

Each service module descriptor 54 has a set of supported query descriptors 104. Service module descriptors 54 cannot use query descriptors 104 defined in other service module descriptors 54 since the query descriptor 104 belongs to one service module descriptor 54.

Aspects provide additional operations (beyond the standard operations select, insert, update, delete, select by relation, and update fields) in the form of actions, which are described by aspect action descriptors 92. Aspect action descriptors 92 are specialized operation descriptors 70 on aspects. The aspect descriptor 56 can have a set of supported aspect action descriptors 92. The input parameter for an aspect descriptor 96 defines the parameter structure of the action. The input key descriptor 64 specifies which keys may be used for mass operations, e.g., an email action may have as input a list of keys representing multiple emails.

Action descriptors 96 can define actions for multiple actions like Print, Email, Fax, Approve, Clear, Cut, Copy, Paste and Cancel. But there also may be more aspect specific actions that can be only used for one or a few aspects. Action descriptors 96 are introduced to enforce reuse. Each aspect action descriptor 92 is associated with an action descriptor 96, where the name and the meaning (textual description) are defined.

Action descriptors 96 specify a name and the meaning (textual description) of the action. They do not specify parameters and are not used to describe polymorphic behavior of operations. They can be used for taxonomies.

A service module group descriptor 58 can be associated with aspect descriptors 56, relation descriptors 84, and query descriptors 104. An aspect group descriptor 78 can be associated with relation descriptors 84, aspect action descriptors 92, and field descriptors 86.

The diagram 50 includes a zero or more to zero or more relationship 52 between service module descriptor 54 and aspect descriptor 56, since multiple instances of aspects can be associated with multiple instances of service modules. Service module group descriptor 58 has a zero or more to zero or more directed relation 60 towards aspect descriptor 56 since aspects can be grouped together in a service module group. Service module group descriptor 58 also has a zero or more to one composite aggregation relationship 62 with service module descriptor 54 because service module groups can be aggregated together in a service module. Key descriptor 64, as a specialization of aspect descriptor 56, has an inheritance relationship 66 with aspect descriptor 56. Key descriptor 64 also has a one to zero or more relationship 68 with aspect descriptor 56, since each aspect has a key associated with that aspect to uniquely identify instances of the aspect. Operation descriptor 70 has a directed zero or more to zero or more relationship 72 with key descriptor 64, since operations can include input keys. Aspect descriptor 56 has a zero or more to one relationship 76 with structure descriptor 74 since each aspect descriptor 56 can have a structure descriptor 74 defining its attributes. Aspect group descriptor 78 has a zero or more to one composite aggregation relationship 80 with aspect descriptor 56 since an aspect can be an aggregation of aspect groups. Aspect group descriptor 78 also has a directed zero or more to zero or more relationship 82 with relation descriptor 84 since aspect groups also include relations. Structure descriptor 74 has a one to zero or more ownership relationship 90 with field descriptor 86 since a structure can use many data fields to define itself. Aspect group descriptor 78 also has a zero or more to zero or more relationship 88 with field descriptor 86.

Aspect action descriptor 92 has a zero or more to one aggregation relationship 100 with aspect descriptor 56 since aspects can provide actions that can be executed on the aspect. Aspect action descriptor 92 has an inheritance relationship 102 with its superior class operation descriptor 70. Query descriptor 104 also has an inheritance relationship 106 with its superior class operation descriptor 70. Service module descriptor 54 has a one to zero or more relationship 108 with query descriptor 104 since a service module can include zero or more queries. Service module group descriptor 58 has a zero or more to zero or more directed relationship 110 with query descriptor 104 since queries can also be grouped together in a service module group.

Operation descriptor 70 has a zero or more to zero or one relationship 112 with structure descriptor 74 since each operation includes input parameters in the form of structures. Query descriptor 104 has a zero or more to zero or one relationship 114 with aspect descriptor 56 since queries include a resulting aspect. Relation descriptor 84 has zero or more to one relationships 116 and 118 with aspect descriptor 56 since relations have source and target aspects.

To illustrate these descriptors defining an organization of the meta data in repository 18, the examples below use a fixed set of relational database tables. Other persistence mechanisms (e.g., XML) can also be used. The relational database tables are defined in Tables 1-6, where each row of Tables 1-6 defines a field or column of the relational database tables. The main data type of repository 18 is the aspect. The database tables for describing an aspect are Table 1, SCOL_ASPECT, and Table 2, SCOL_ASP_ACTION. Table 1 includes descriptions of properties of an aspect. The key field for Table 1, SCOL_ASPECT, is the ASPECT_NAME field because an aspect's name is unique for an aspect. The ASPECT_CATEGORY field indicates if the aspect represents a non-key aspect or a key aspect. The STRUCTURE field indicates a data structure name for data attributes of the aspect. A key is associated with an aspect by putting the key's name in the KEY_ASPECT field. The SERVICE_PROVIDER field defines the aspect service provider 34 for an aspect. The TRANSAC_PROVIDER field defines the transaction service provider 40 for an aspect. The LOCKING_PROVIDER field defines the locking service provider 42 for an aspect. The repository 18 can also have a corresponding table for the description of an aspect.

TABLE 1

SCOL_ASPECT definition

| Field Name | Key | Description |
|---|---|---|
| ASPECT_NAME | X | Name of the aspect |
| ASPECT_CATEGORY | | Aspect type: aspect or key aspect |

TABLE 1-continued

SCOL_ASPECT definition

| Field Name | Key | Description |
| --- | --- | --- |
| STRUCTURE | | The corresponding data structure of the aspect |
| KEY_ASPECT | | The corresponding key aspect |
| SERVICE_PROVIDER | | The name of the corresponding aspect service provider class |
| TRANSAC_PROVIDER | | The name of the corresponding transaction provider class |
| LOCKING_PROVIDER | | The name of the corresponding locking provider class |

Aspects can provide actions that can be executed on the aspect. Descriptions of the actions are stored in Table 2, SCOL_ASP_ACTION. The actions are uniquely denoted by the aspect name and the name of the action so ASPECT_NAME and ACTION_NAME fields are key fields for SCOL_ASP_ACTION table. The field PARAM_STRUCTURE refers to a data structure that holds input data parameters for the action. The field INPUT_KEY_ASPECT refers to the name of a key aspect that defines the type of keys used to designate which instances of data types in repository 18 are acted upon by the action. The field PROVIDER_CLASS refers to the name of the action service provider class providing the action from the service provider implementing the aspect named in ASPECT_NAME field.

TABLE 2

SCOL_ASP_ACTION definition

| Field Name | Key | Description |
| --- | --- | --- |
| ASPECT_NAME | X | Name of the aspect |
| ACTION_NAME | X | Name of the Action |
| PARAM_STRUCTURE | | The corresponding data structure of the input parameters |
| INPUT_KEY_ASPECT | | The name of the key aspect of the input aspects |
| PROVIDER_CLASS | | The name of the action service provider class |

Aspects can be related with each other. Descriptions of the relations between aspects are stored in Table 3, SCOL_RELATION. A relation is uniquely defined by its name so the key of a relation table is the relation name specified in field RELATION_NAME. For each relation, the field SOURCE_ASPECT defines the aspect that is the source of the directed relation, the field TARGET_ASPECT defines the aspect that is the target of the directed relation, the field TARGET_PROVIDER defines the query relation service provider for the target aspect, the field REL_PARAM_TYPE defines the type of the relation (Parent-Child or Child-Parent), and the field REL_PARAMETER defines the cardinality of the relation. The repository 18 can also have a corresponding table for the description of a relation.

TABLE 3

SCOL_RELATION definition

| Field Name | Key | Description |
| --- | --- | --- |
| RELATION_NAME | X | Name of the relation |
| SOURCE_ASPECT | | Name of the source aspect of the relation |

TABLE 3-continued

SCOL_RELATION definition

| Field Name | Key | Description |
| --- | --- | --- |
| TARGET_ASPECT | | Name of the target aspect of the relation |
| TARGET_PROVIDER | | Name of the query relation service provider class |
| REL_PARAM_TYPE | | Type of the relation |
| REL_PARAMETER | | Parameter of the relation |

The properties of a service module are stored in the Table 4, SCOL_SVC_MODULE. Each Service module is uniquely described by its name so SVC_MODULE_NAME field is the key field for a SCOL_SVC_MODULE table. For each service module, the field TRANSAC_PROVIDER specifies the name of the transaction provider 40 for the service module. The repository 18 also has a corresponding table for the description of a service module.

TABLE 4

SCOL_SVC_MODULE definition

| Field Name | Key | Description |
| --- | --- | --- |
| SVC_MODULE_NAME | X | Name of the service module |
| TRANSAC_PROVIDER | | The name of the corresponding transaction service provider class |

Every service module is associated with aspects that can be used within the service module. Names of the aspects that can be used within each service module are stored in the Table 5, SCOL_ASPECT_USE. Since each aspect-service module usage is uniquely described by a name of a service module and the name of an aspect, the fields SVC_MODULE_NAME and ASPECT_NAME are the keys for SCOL_ASPECT_USE table.

TABLE 5

SCOL_ASPECT_USE definition

| Field Name | Key | Description |
| --- | --- | --- |
| SVC_MODULE_NAME | X | Name of the service module |
| ASPECT_NAME | X | Name of the aspect |

Service Modules can provide queries to retrieve data. Descriptions of the queries of a service module are stored in the table SCOL_QUERY illustrated in Table 6 below. The structure of the database table is defined in Table 6. Since each query is uniquely defined by a service module and a query name, the fields SVC_MODULE_NAME and QUERY_NAME are key fields for SCOL_QUERY table. Other fields include RESULT_ASPECT that specifies the name of an aspect defining the data type returned by the query and PARAM_STRUCTURE that specifies a data structure containing the input parameters for the query. For example, a query done on a particular aspect (e.g., specified in field RESULT_ASPECT) associated with the service module can include input parameters that are matched with attributes of instances of the particular aspect and the matching instances are returned as a dataset of keys referring to those instances. The field INPUT_KEY_ASPECT is used to define the key aspect describing keys that could be used as filters for the query. The PROVIDER_CLASS specifies the name of the query service provider 32 associated with each query. The repository 18 also has a corresponding table for the description of a query.

TABLE 6

SCOL_QUERY definition

| Field Name | Key | Description |
|---|---|---|
| SVC_MODULE_NAME | X | Name of the service module |
| QUERY_NAME | X | Name of the query |
| RESULT_ASPECT | | Name of the result aspect of the query |
| PARAM_STRUCTURE | | The corresponding data structure of the input parameters |
| INPUT_KEY_ASPECT | | The name of the key aspect of the input aspects |
| PROVIDER_CLASS | | The name of the corresponding query provider class |

As stated previously, architecture 38 includes six service provider classes (i.e., transaction 40, query 32, aspect 34, action 44, query relation 46, and locking 42) for handling requests from front end application program 12, other than requesting meta data from repository 18, which is handled by repository service provider class 30. To provide services upon request by front end application program 12, service manager 16 directly calls instances of service provider classes. These instances of service provider classes can be located on the same computer (e.g., 6) as service manager 16 or on a different computer.

The locking service provider 42 can be used to implement a generic lock manager for a single aspect or a set of aspects. Each locking service provider 42 needs to be registered with an aspect. The name of the locking service provider 42 is set in SCOL_ASPECT table in LOCKING_PROVIDER field for each aspect. Locking service provider class has two methods that can be called by service manager 16. These are LOCK and UNLOCK. LOCK takes as input a collection of keys representing business objects to be locked, a name of an aspect representing a class of the business objects, and a lock mode. There are various locking modes depending on the locking capability of the target system. Locking mode can specify "E", "S", or "SP". "E" means an exclusive lock or that only one client can obtain the lock. "S" means a shared lock indicating that any clients can lock and no lock exclusive to one client is possible. "SP" means the same as "S" but a subsequent upgrade to an exclusive lock is possible.

LOCK method outputs a Boolean value indicating if the request is rejected or not and also outputs a return code. UNLOCK takes as input a collection of keys representing business objects to be unlocked and a name of an aspect representing a class of the business objects to be unlocked. UNLOCK method also outputs a Boolean value indicating if the request is rejected or not and a return code. A call to UNLOCK is rejected if a transactional buffer is already in a "dirty" state, i.e. if any update, insert, delete operation or an action that is not marked as COL_AFFECTS_NOTHING has been issued since the last CLEANUP call. All locks are removed if the CLEANUP method (described below) of the transaction service provider class is called with reason 'END'.

A transaction is a sequence of information exchange and related work (such as database updating) that is treated as a unit for the purposes of satisfying a request from front end application program 12 to service manager 16 and for ensuring integrity of backend database 24. For a transaction to be completed and changes to database 24 to be made permanent, a transaction has to be completed in its entirety. All of the steps of a transaction are completed before the transaction is successful and the database is actually modified to reflect all of the requested changes. If something happens before the transaction is successfully completed, any changes to the backend database 24 must be kept track of so that the changes can be undone.

To handle transactions, the transaction service provider 40 receives notifications on the various states of a transaction between service manager 16, another non-transaction service provider (e.g., 32, 34, 44, 46), and front end application program 12 (or service manager proxy 14 in some cases). These notifications are the transaction service provider 40's methods BEFORE_SAVE, CLEANUP, and SAVE that are called by the service manager 16 during transactions.

The service manager 16 calls the transaction service provider 40's method BEFORE_SAVE to check if the transactional buffer can be saved. This allows checking if the internal state of the non-transaction service provider is ready for being saved. The method BEFORE_SAVE returns false if it is not possible to save the transactional buffer, then the transaction end is aborted. Thus, the BEFORE_SAVE method has a BOOLEAN return parameter. BEFORE_SAVE takes a Boolean as an input parameter REJECTED. The transactional service provider 16 can prevent the following save and commit operations by setting the REJECTED parameter to a non-initial value, i.e. to "true". The method BEFORE_SAVE is called within the service manager 16's sequence of operations triggered by the front-end application 12's SAVE method.

The SAVE method finally triggers the application to save the transactional buffer to the database 24. By calling SAVE, all internal states of a non-transaction service provider are made persistent—either by direct updates or by creating appropriate calls to the update task. If all service providers in architecture 38 have received a SAVE request, service manager 16 commits the transaction.

The CLEANUP method tells all non-transaction service providers to release all their transactional buffers and enqueue-based locks. Calling CLEANUP method communicates that all service providers in architecture 38 need to clean up their internal state. CLEANUP takes a REASON string as an input parameter. The REASON field indicates the reason for the clean up operation. This can be either a 'COMMIT' due to a SAVE-operation or the 'END' of the transaction due to the system closing the transaction automatically. There is no guarantee that cleanup is called under failure conditions.

The action service provider 44 is called by service manager 16 to execute an action for an aspect. The name of action service provider 44 is set in the PROVIDER_CLASS field of SCOL_ASP_ACTION table for a row corresponding to an action. Action service provider 44 has one method EXECUTE. EXECUTE method takes as input parameters an aspect name (ASPECT), a set of keys (INKEYS) specifying which instances of the aspect are acted upon by the action, a generic input parameter (INPARAM), the name of the action (ACTION) to be executed, a set of keys (RELATION_INKEY) for an action acting on an relation, and a name of the relation (RELATION). EXECUTE method returns as output parameters the changed or newly created objects (OUTRECORDS), which have been modified by the action. The objects returned by the OUTRECORDS parameter are transported back to the calling aspect object on the client framework.

The aspect service provider 34 is called by service manager 16 to provide functionality to read and modify the content of one or more aspects. As described previously, an aspect is described by its name (the name is globally unique within a repository), an associated data structure, an associated key (i.e. identifier) structure, a set of implemented actions, a set of outgoing relations, and a set of incoming relations. Aspect service provider 34 has methods EXECUTE, SELECT, INSERT, UPDATE, DELETE, SELECT_BY_RELATION, and UPDATE_FIELDS.

The method EXECUTE is derived from the action service provider 44 and allows executing an action. EXECUTE has as input parameters a name (ASPECT) of the aspect, where the action is to be executed on, keys (INKEYS) of the objects, where the action is executed on, parameters (INPARAM) for the actions, name (ACTION) of the action. Returned parameters include modified or created aspect rows (OUTRECORDS), a Boolean flag (REJECTED) indicating if the request for the method was rejected or not, and return codes (RETURN_CODES).

The method SELECT reads the aspect data associated with the input keys for a given aspect. SELECT has as input parameters a list of keys (INKEYS) encoded within the associated key structure to describe the aspect rows to read and the name (ASPECT) of the aspect. SELECT has as output parameters the result (OUTRECORDS) encoded in the aspect data structure, a Boolean flag (REJECTED) indicating if the request for the method was rejected or not, and return codes (RETURN_CODES).

The method INSERT inserts new data into an aspect. INSERT includes as input parameters a table containing the records to be inserted, if aspect is designed for row wise write operations (INRECORDS). The method may allow the inserted record to also define key fields, depending on the aspect description (e.g., a parameter ExternalKeys=true or false). Input parameters also include the name (ASPECT) of the aspect, a set of keys (RELATION_INKEY) for an action acting on a relation, and a name of the relation (RELATION). Method INSERT returns a set of records (OUTRECORDS) representing the inserted records together with their keys and possible other modifications that aspect service provider 34 wants to do on the inserted records. For example one modification can be filling out calculated fields for the set of records. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The UPDATE method updates existing instances of an aspect either record wise or field wise. The input parameters for UPDATE method include a table (INRECORDS) containing the instance keys to be updated, if the aspect is designed for row wise write operations. Input parameters also include the name (ASPECT) of the aspect. Parameters returned by the UPDATE method include the updated records (OUTRECORDS) together with their keys and possible other modifications the service provider wants to do. The order of the OUTRECORDS rows can correspond to the order of the INRECORDS rows. Other output parameters include a Boolean flag (REJECTED) indicating if the request for the SELECT method was rejected or not and return codes (RETURN_CODES).

The DELETE method deletes rows or instances of an aspect in the backend (e.g., backend database 24). Input parameters for DELETE method are a list of keys (INKEYS) encoded within the associated key structure to describe the aspect rows to be deleted and the name (ASPECT) of the aspect. Parameters returned by the DELETE method include a Boolean flag (REJECTED) indicating if the request for the DELETE method was rejected or not and return codes (RETURN_CODES).

The SELECT_BY_RELATION method returns, depending on the relation parameter description, either attributes to follow a relation or another aspect, where the source aspect has a relation pointing to that other aspect. Input parameters for SELECT_BY_RELATION are name (RELATION) of the relation to follow, records (INRECORDS) of the source aspect, name of the source aspect (ASPECT), and a structure (OPTIONS) describing various options of the queries for paging, etc. Output parameters returned by SELECT_BY_RELATION include the result encoded in the target aspect data structure (OUTRECORDS), an index table showing which row of the OUTRECORDS parameters belongs to which INRECORDS row (INDEX), a description of the result (DESCRIPTION), a Boolean flag (REJECTED) indicating if the request for the SELECT_BY_RELATION method was rejected or not and return codes (RETURN_CODES).

The UPDATE_FIELDS method updates fields of instances of an aspect. Input parameters include a list of keys (INRECORDS) encoded within the associated key structure to describe the instances of the aspect to be updated. Input parameters also include a table (INFIELDS) containing pairs of names of fields and corresponding values to be updated within a set of records, if the aspect is designed for field wise write operations. If more than one instance of an aspect is to be updated, the additional field index INKEY points to the associated key record. Input parameters also include the name (ASPECT) of the aspect. Parameters returned by UPDATE_FIELDS include the created or changed instances of the aspect (OUTRECORDS) together with their keys and possible other modifications performed by the aspect service provider 34. The index of the various OUTRECORDS rows have to be associated to the row indexes in the INFIELDS table. Other parameters returned include a Boolean flag (REJECTED) indicating if the request for the UPDATE_FIELDS method was rejected or not and return codes (RETURN_CODES).

Query service provider 32 performs queries. A query in the repository 18 is described in table SCOL_QUERY by the query name in field QUERY_NAME, the associated parameter structure in field PARAM_STRUCTURE, the associated result aspect in field RESULT_ASPECT, and optionally, the associated aspect key, with its unique data structure in field INPUT_KEY_ASPECT. Query service provider 32 has one EXECUTE method that performs a query on one or more aspects. Input parameters include the name of the query (QUERY), a data structure (INPARAM) containing the parameters for the query, and an optional table-type parameter (INKEYS), containing the keys of the aspect rows to which the query shall be restricted. INKEYS can but does not have to consist of the keys of OUTRECORDS returned by EXECUTE method. INKEYS can be of any key aspect structure. Which key structure is associated to the query is specified in the repository 18 in table SCOL_QUERY in field INPUT_KEY_ASPECT. Optionally, other input parameters can be specified including a structure describing various options (OPTIONS) of the queries (e.g., for paging) and SELECTIONS.

Parameters returned by EXECUTE method include a description (DESCRIPTION) of the query, the query result (OUTRECORDS), and a Boolean flag (REJECTED) indicating if the request for the EXECUTE method was rejected or not The EXECUTE method returns the results specified by the query parameters. If the INKEYS table parameter is not empty, the result is restricted to the objects that fulfill the query parameters. INKEYS and INPARAM both restrict the query, but are used in different ways. For example, a query can be defined that returns a list of orders not yet delivered. In such an example, the structure INPARAM can specify that only orders from customers with last names from A-D are to be returned. The INKEYS is a table of all orders that have not yet been delivered. OUTRECORDS contains all orders from the relevant customers, in this case with last names A-D, that have not been delivered yet. In one example, the OUTRECORDS result of a query is a disconnected aspect, that is, the aspect is always read-only. No further backend operations can be performed on this aspect. In this example, the received keys can be used as parameters to select other aspect rows using the aspect service provider 34 and, for example, its SELECT method.

The query relation service provider 46 implements a routine in a service provider (e.g., aspect service provider 34) for an aspect that is the target of a relation. Methods of query relation service provider 46 are indirectly called from the aspect service provider 34 of the source aspect, if the relation is marked as SOURCE_KEYS or ATTRIBUTES.

Query relation service provider 46 has a SELECT_TARGET method. The method SELECT_TARGET has input parameters as follows. Input parameters include the name (SOURCE_ASPECT) of the source aspect. Optionally, the method also includes an input parameter defining a proxy interface (TARGET) to the target aspect's SELECT method. Specifying the TARGET parameter allows calling the SELECT method of the aspect service provider 34 for the target aspect without directly knowing the aspect service provider 34 for the target aspect. This enables a query relation service provider 46 to be added to a service module without knowledge of the aspect service provider 34 for the target aspect.

Another input parameter for the SELECT_TARGET method is the relation (RELATION). Another input parameter is a table of fields (INPARAMS) to describe the relation. To allow mass selection, INPARAMS is a table where every row describes a single selection. An INDEX parameter is used to relate the various rows of the INPARAMS structure to the OUTRECORDS rows. Another optional input parameter is a structure (OPTIONS) describing various options of the queries (e.g., for paging).

The SELECT_TARGET method returns parameters that include the result encoded with the structure of the target aspect (OUTRECORDS), a description of the query result (DESCRIPTION), and a proxy interface to the target aspects SELECT method. Other output parameters include an index (INDEX) to describe the relation between the INPARAMS records and the OUTRECORDS parameter, a Boolean flag (REJECTED) indicating if the request for the SELECT_TARGET method was rejected or not and return codes (RETURN_CODES).

The service providers 32, 34, 40, 42, 44, and 46, as described above, enable the following transactional model for the architecture 38. Executing method SELECT of aspect service provider 34 reads from the backend database 24 or reads from a transactional buffer stored in the back-end. Aspect service provider 34 merges data from both sources—the database and its transactional buffer—in a consistent way so that the merge data reflects the updates made so far in this transaction. Next, executing UPDATE, INSERT, MODIFY, or DELETE methods of aspect service provider 34 builds up a transactional buffer. Before actually changing data in the transactional buffer, the service manager 16 has to acquire a transactional lock on the data and read the data under the protection of a lock. There are exclusive, shared, and shared promotable lock modes available using locking service provider 42 as described previously. Locking has to be accompanied by selecting the locked data again under the protection of the lock. Applications can support optimistic locking by providing time-stamped or otherwise versioned data, and merging actual and modified data on the front-end in case of conflicts.

The BEFORE_SAVE method of the transaction service provider 40 enables all participating service providers to declare if they are ready for saving the transactional buffer. The SAVE method of the transaction service provider 40 finally triggers service manager 16 to save the transactional buffer to the backend database 24.

The CLEANUP method of the transaction service provider 40 notifies all service providers (e.g., aspect service provider 34) to release all their transactional buffers and enqueue-based locks. If CLEANUP is called with reason 'END', all locks have to be released. If reason is set to 'COMMIT', each service provider can chose to keep its locks. Aspect service provider 34 must not call COMMIT WORK or ROLLBACK WORK internally on its own. The service manager 16 enforces this by automatically aborting the transaction if aspect service provider 34 is trying to commit a transaction.

The supported locking models and lock policies are as follows. Using policy S, many participants can obtain a shared lock. If a shared lock is obtained on an object, no exclusive lock or SP lock can be obtained. Shared locks can only be used to achieve a consistent view on a larger set of data during read operations. Using policy E, only a single participant can obtain a lock. Using policy SP (shared promotable), many participants can obtain the lock. If a SP lock exists, exclusive locks can only be obtained by participants already having a SP lock on the object. Only one of the participants can upgrade the lock to an exclusive lock. No other participant, who did obtain a lock prior to the upgrade, can upgrade to exclusive even if the first participant did release its lock.

EXAMPLE

The architecture 38 (of FIG. 3) implements a simple task of creating a new customer, receiving the customer's order of one or more products via GUI 28 and submitting the order to a business process. To support this example, backend database 24 can be implemented using a relational database designed according to the definitions in Tables 1-6 above to define lists of customers, addresses, product types, baskets, positions of products in a basket for each order, and orders. In Tables 7-12, key field headings are denoted with an asterisk. Customers Table 7 defines customers and each customer is uniquely identified by a CustomerId field. Customers Table 7 also includes a NAME field and a foreign key field AddressId that links addresses in an Addresses table to customers.

TABLE 7

Customers

| CustomerId* | NAME | AddressId |
|---|---|---|
| 1 | John Smith | 1 |
| 2 | David Klein | 2 |

Addresses Table 8 defines addresses having a town and a street. The Address id itself is a valid unique key for an address and the connection between address and customer is done through the Customers Table 7 (AddressID field).

TABLE 8

Addresses

| AddressId* | Town | Street |
|---|---|---|
| 1 | Athens | Main Street |
| 2 | Louisville | Willow Avenue |

Table 9 defines products having names with key ProductId.

TABLE 9

Products

| ProductId* | Name |
|---|---|
| 1 | Saw |
| 2 | Hammer |
| 3 | Wrench |
| 4 | Screwdriver |

Table 10 defines shopping baskets having customers with key BasketId.

TABLE 10

Baskets

| BasketId* | CustomerId |
|---|---|
| 1 | 2 |
| 2 | 1 |

Table 11 defines positions of orders in baskets and having products. Positions are dependent on the existence of baskets and orders so the primary key for positions is a combination of PositionId, BasketId, and OrderId.

TABLE 11

Positions

| PositionId* | BasketId* | OrderId* | ProductId |
|---|---|---|---|
| 1 | 1 | 3 | 2 |
| 2 | 1 | 2 | 3 |
| 3 | 2 | 1 | 4 |

Table 12 defines orders having customers and indicating whether or not each order is submitted with primary key OrderId.

TABLE 12

Orders

| OrderId* | CustomerId | Submitted |
|---|---|---|
| 1 | 1 | False |
| 2 | 2 | False |
| 3 | 2 | False |

Figure 5:
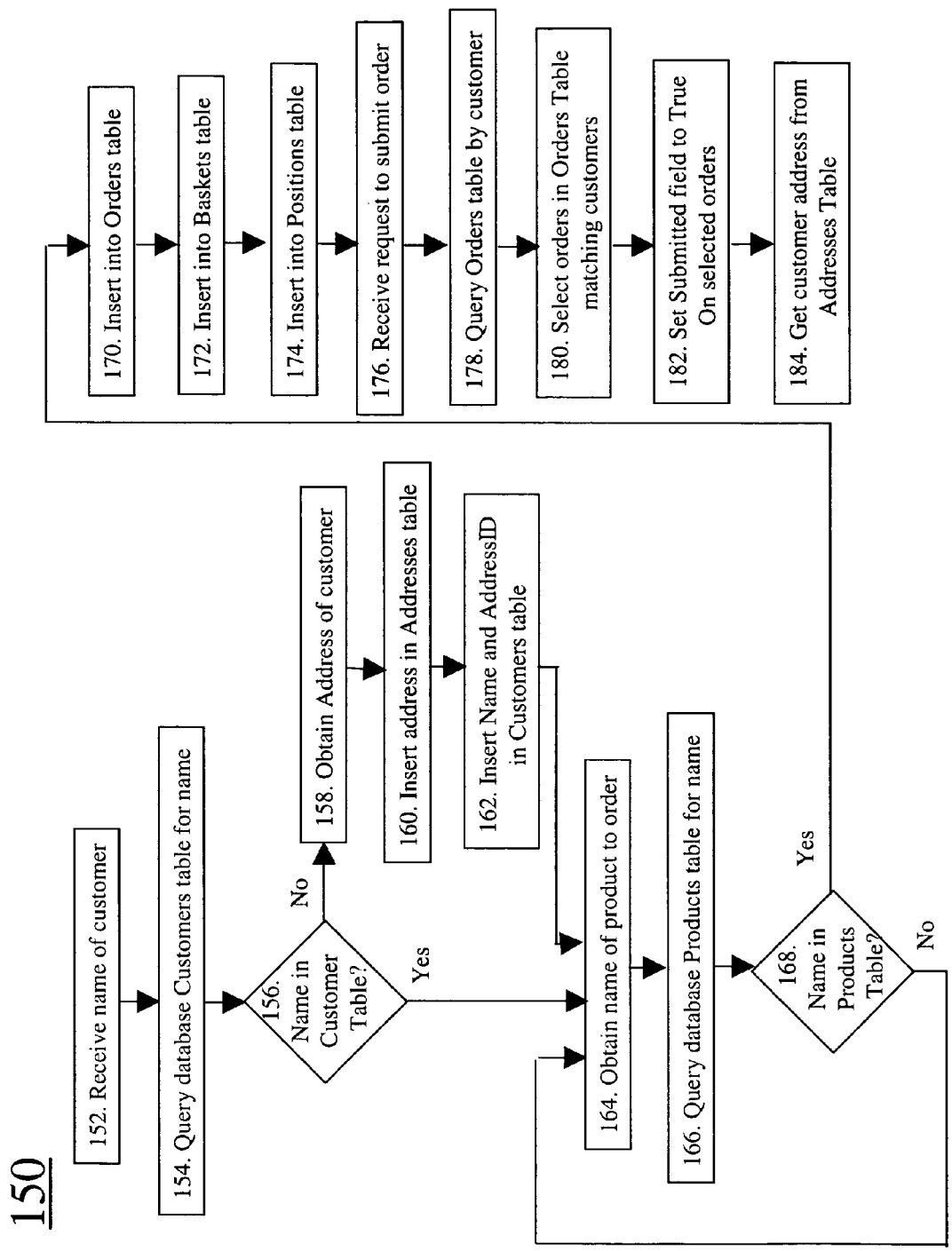
FIG. 5 is a flow diagram of a business process.

As shown in FIG. 5, process 150 defines the database operations on backend database 22 that are needed for this simple task using these tables 7-12. Process 150 includes front end application program 12 receiving (152) a name of a customer. Process 150 includes the business software application querying (154) a database with Customers table (Table 7) for the name in the NAME field. Process 150 includes checking if the customer's name matches (156) a row in the Customers table (Table 7). If no match is made, process 150 includes the business software application obtaining (158) the address of the customer, inserting (160) a new row in the Addresses table (Table 8) with a new AddressID and address, and inserting (162) a new row in the Customers table (Table 7) with a new CustomerId, and the AddressID. If a match is made, process 150 includes the business software obtaining (164) a name of a product to order for the customer. Process 150 includes the business software querying (166) the Products table (Table 9) for the product name.

Process 150 includes checking if the product name matches (168) a row in the Products table (Table 9). If a match is made, then process 150 includes the business software inserting (170) a new order in the Orders table (Table 12) with the customer's CustomerId and setting the Submitted field to "False". Otherwise, process 150 returns to obtaining (164) the name of the product to order. Process 150 includes the business software inserting (172) a new basket in the Basket table (Table 10) with the customer's CustomerId.

Process 150 includes the business software inserting (174) a new position in the Positions table (Table 11) with the CustomerId, BasketId, and ProductId. Process 150 includes the business software receiving (176) a request to submit the order. Process 150 includes the business software querying (178) the Orders table (Table 12) by the customer's CustomerId and this query returns orders matching the customer's CustomerId. Process 150 includes the business software selecting (180) orders in the Orders table (Table 12) matching the orders for the customer's CustomerId. Process 150 includes the business software setting (182) the Submitted field in the selected rows in the Orders table (Table 12) to "True". Process 150 includes the business software getting (184) the address of the customer from the Addresses Table 8 for order delivery by querying Customers Table 7 for an AddressId and then querying Addresses Table 8 for a matching AddressId.

Tables 13-19 show tables in one implementation of repository 18 representing meta data for the example database illustrated by Tables 7-12. Tables 13-19 follow the definitions of Tables 1-6 described above such that definitions in rows of Tables 1-6 correspond to columns or fields in Tables 13-19. As with Tables 7-12, key fields in Tables 13-19 are labeled by an asterisk.

Table 13 follows the definition of a SCOL_ASPECT table (defined in Table 1) to define aspects A_Customer, A_Address, A_Product, A_Basket, A_Position, and A_OrderHeader. Each aspect has a corresponding key aspect that defines a unique key for each instance. For example, aspect A_Customer has a key aspect Customer_Key. This key aspect in the meta data repository 18 can correspond to a key for a relational database table in backend database 24. For example, the key for Customers table (Table 7) is CustomerId field. The rows in STRUCTURE field correspond to a data dictionary in Table 19 below. For example, Table 19 can define Customer_Structure to have a NAME field of type CHAR indicating a character string. The rows in SERVICE_PROVIDER field correspond to particular aspect service providers handling services for aspects. In Table 13, all of the aspects are assigned to S_provider aspect service provider (e.g., 34 referring to FIG. 3). The rows in TRANSAC_PROVIDER field correspond to particular transaction service providers 40 handling transactions for aspects. In Table 13, all of the aspects are assigned to T_provider transaction service provider (e.g., 40 referring to FIG. 3). The rows in LOCKING_PROVIDER field correspond to particular locking service providers handling locking for aspects. In Table 13, all of the aspects are assigned to L_provider locking service provider (e.g., 42 referring to FIG. 3).

TABLE 13

Example SCOL_ASPECT table

| ASPECT_NAME* | ASPECT_CATEGORY | STRUCTURE | KEY_ASPECT | SERVICE_PROVIDER | TRANSAC_PROVIDER | LOCKING_PROVIDER |
|---|---|---|---|---|---|---|
| A_Customer | aspect | Customer_Structure | Customer_Key | S_provider | T_provider | L_provider |
| Customer_Key | key aspect | Customer_Key_Table | Customer_Key | S_provider | T_provider | L_provider |
| A_Address | aspect | Address_Structure | Address_Key | S_provider | T_provider | L_provider |
| Address_Key | key aspect | Address_Key_Table | Address_Key | S_provider | T_provider | L_provider |
| A_Product | aspect | Product_Structure | Product_Key | S_provider | T_provider | L_provider |
| Product_Key | key aspect | Product_Key_Table | Product_Key | S_provider | T_provider | L_provider |
| A_Basket | aspect | Basket_Structure | Basket_Key | S_provider | T_provider | L_provider |
| Basket_Key | key aspect | Basket_Key_Table | Basket_Key | S_provider | T_provider | L_provider |
| A_Position | aspect | Position_Structure | Position_Key | S_provider | T_provider | L_provider |
| Position_Key | key aspect | Position_Key_Table | Position_Key | S_provider | T_provider | L_provider |
| A_OrderHeader | aspect | OrderHeader_Structure | OrderHeader_Key | S_provider | T_provider | L_provider |
| OrderHeader_Key | key aspect | OrderHeader_Key_Table | OrderHeader_Key | S_provider | T_provider | L_provider |

Table 14 follows the definition of a SCOL_ASP_ASPECT table (defined in Table 2) to define an action Submit for aspect A_OrderHeader. Field INPUT_KEY_ASPECT specifies the key aspect that is sent by application 14 with the action to specify which instances of aspect A_OrderHeader should be acted upon by the action. Action Submit changes the Submitted field of those instances in backend database 24 to True. No extra parameters are required for this action Submit so PARAM_STRUCTURE field is blank in Table 14. Field PROVIDER_CLASS specifies the aspect service provider 34 (referring to FIG. 3) assigned to each action. In Table 14, action Submit is assigned to aspect service provider S_provider (e.g., 34 referring to FIG. 3).

TABLE 14

Example SCOL_ASP_ACTION Table

| ASPECT_NAME* | ACTION_NAME* | PARAM_STRUCTURE | INPUT_KEY_ASPECT | PROVIDER_CLASS |
|---|---|---|---|---|
| A_OrderHeader | Submit | | OrderHeader_Key | S_provider |

Figure 6:
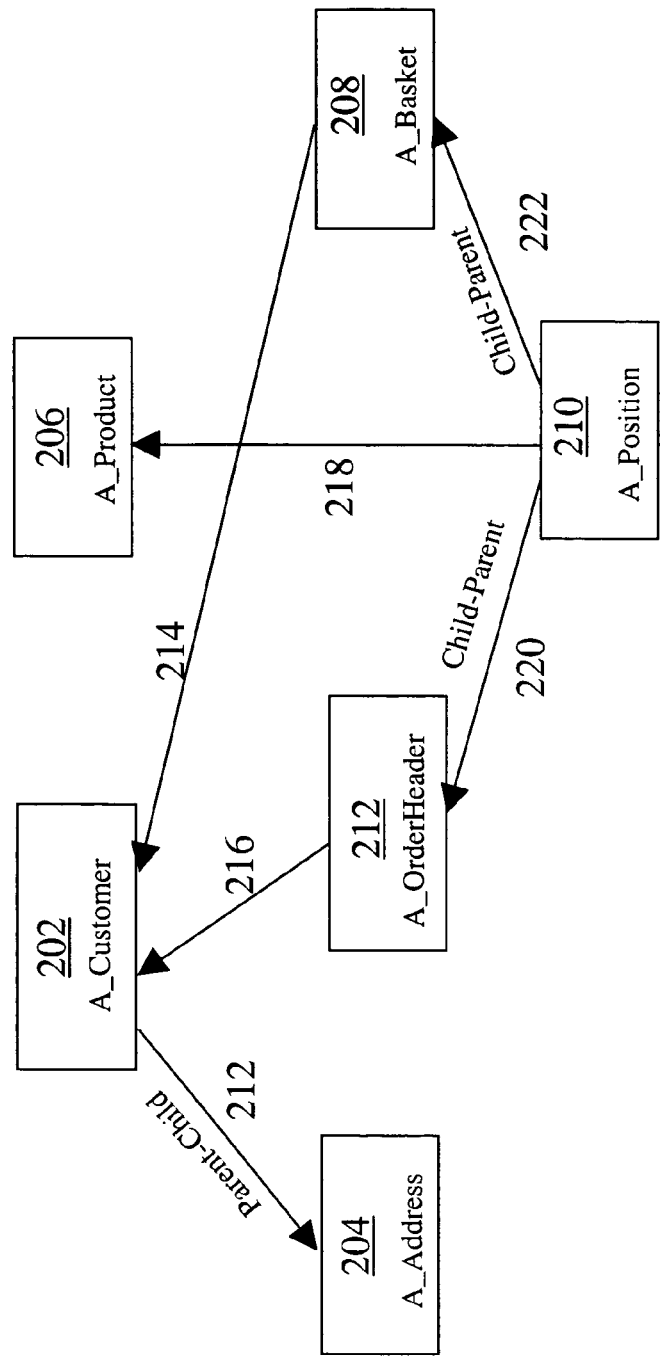
FIG. 6 is a diagram showing relations between different aspects for a business software application.

Table 15 follows the definition of a SCOL_RELATION table (defined in Table 3) to define relations between aspects defined in Table 13. These relations reflect relations between data tables in backend database 24 illustrated by example tables 7-12. These relations between aspects are also illustrated in FIG. 6 for aspect A_Customer 202, aspect A_Address 204, aspect A_Product 206, aspect A_Basket 208, aspect A_Position 210, and aspect A_OrderHeader 112. These relations include R_Customer_To_Address 212, R_Basket_To_Customer 214, R_OrderHeader_To_Customer 216, R_Position_To_Product 218, R_Position_To_OrderHeader 220, and R_Position_To_Basket 222.

TABLE 15

Example SCOL_RELATION Table

| RELATION_NAME* | SOURCE_ASPECT | TARGET_ASPECT | TARGET_PROVIDER | REL_PARAM_TYPE | REL_PARAMETER |
|---|---|---|---|---|---|
| R_Customer_To_Address | A_Customer | A_Address | S_provider | Parent-Child | |
| R_Basket_To_Customer | A_Basket | A_Customer | S_provider | | |
| R_OrderHeader_To_Customer | A_OrderHeader | A_Customer | S_provider | | |
| R_Position_To_Product | A_Position | A_Product | S_provider | | |
| R_Position_To_OrderHeader | A_Position | A_OrderHeader | S_provider | Child-Parent | |
| R_Position_To_Basket | A_Position | A_Basket | S_provider | Child-Parent | |

Table 16 follows the definition of a SCOL_SVC_MODULE table (defined in Table 4) to define example service modules for the example definitions of backend database 24 given in tables 7-12. Table 16 defines service modules S_Customer, S_Product, S_Basket, and S_Order. Field TRANSAC_PROVIDER specifies a transaction service provider 40 (referring to FIG. 3) to each service module. In Table 16, transaction service provider T_provider (e.g., 40, referring to FIG. 3) is assigned to the service modules.

TABLE 16

Example SCOL_SVC_MODULE Table

| SVC_MODULE_NAME* | TRANSAC_PROVIDER |
|---|---|
| S_Customer | T_provider |
| S_Product | T_provider |
| S_Basket | T_provider |
| S_Order | T_provider |

Table 17 follows the definition of a SCOL_ASPECT_USE table (defined in Table 5) to associate service modules (provided by Table 16) with aspects (provided by Table 13).

TABLE 17

Example SCOL_ASPECT_USE Table

| SVC_MODULE_NAME* | ASPECT_NAME* |
|---|---|
| S_Customer | A_Customer |
| S_Customer | A_Address |
| S_Product | A_Product |
| S_Basket | A_Basket |
| S_Basket | A_Position |
| S_Order | A_OrderHeader |
| S_Order | A_Position |

Table 18 follows the definition of a SCOL_QUERY table (defined in Table 6) to define queries designed to facilitate business process 150 of FIG. 5. For example, QueryByName query associated with S_Customer service module takes a Customer_Stucture as input for the query and a set of customer keys (Customer_Key) that defines which keys may be used for filtering. Field PROVIDER_CLASS specifies which query service provider 32 (referring to FIG. 3) is associated with each service module. In Table 18, query service provider Q_provider (e.g., 32) is associated with each service module.

TABLE 18

Example SCOL_QUERY Table

| SVC_MODULE_NAME* | QUERY_NAME* | RESULT_ASPECT | PARAM_STRUCTURE | INPUT_KEY_ASPECT | PROVIDER_CLASS |
|---|---|---|---|---|---|
| S_Customer | QueryByName | Customer_Key | Customer_Structure | Customer_Key | Q_provider |
| S_Product | QueryByName | Product_Key | Product_Structure | Product_Key | Q_provider |
| S_Basket | QueryByCustomer | Basket_Key | Customer_Key_Table | Customer_Key | Q_provider |
| S_OrderHeader | QueryByCustomer | OrderHeader_Key | Customer_Key_Table | Customer_Key | Q_provider |

Table 19 defines a data dictionary for the implementation of repository 18 defined in Tables 13-18. Each row defines a structure having a name and multiple data entries and their types. For example, structure Customer_Structure has one data entry titled "NAME" with a CHAR type indicating a character string. The Customer_Key_Table structure defines a CustomerId key for each customer and also has a CHAR type.

TABLE 19

Example SCOL_STRUCT Table

| STRUCT_NAME* | DATA1 | TYPE1 | DATA2 | TYPE2 |
|---|---|---|---|---|
| Customer_Structure | NAME | CHAR | | |
| Customer_Key_Table | CustomerId | CHAR | | |
| Address_Structure | Town | CHAR | Street | CHAR |
| Address_Key_Table | AddressId | CHAR | | |
| Product_Structure | Name | CHAR | ProductId | CHAR |
| Product_Key_Table | ProductId | CHAR | | |
| Basket_Structure | | | | |
| Basket_Key_Table | BasketId | CHAR | | |
| Position_Structure | | | | |
| Position_Key_Table | PositionId | CHAR | | |
| OrderHeader_Structure | Submitted | CHAR | | |
| OrderHeader_Key_Table | OrderId | CHAR | | |

The database operations described above for process 150 are defined in this implementation of repository 18 as follows. Querying (154), included in process 150, of the Customers database table (Table 7) is described in meta data repository 18 by the QueryByName query associated with aspect service module S_Customer in Table 18. This QueryByName query associated with aspect service module S_Customer is selected because the front end application program 12 has obtained a customer name and service module S_Customer contains aspects with customer names. For example, front end application program 12 can submit query QueryByName associated with service module S_Customer with NAME="John Smith" and no filtering Customer_Key specified to service manager 16. Service manager 16 checks repository 18 to ensure that the query is defined. Service manager 16 then submits the query to Q_provider (e.g., 32) that queries the Customer database table (Table 7) in database 24 and the output is sent back to front end application program 12 is a record set containing CustomerId={1}.

Inserting (160), included in process 150, on Addresses database table (Table 8) and inserting (162), included in process 150, on Customers database table (Table 7) are described by standard Insert operations (described previously) on aspects A_Address and A_Customer, respectively, in the meta data repository 18.

Querying (166), included in process 150, on the Products database table (Table 9) for a product name is described by QueryByName query associated with service module S_Product defined in Table 18. For example, application 12 can submit the query QueryByName associated with service module S_Product with Name="Wrench" and no filtering Product_Key specified to service manager 16. Service manager 16 checks repository 18 to ensure that the query is defined. Service manager 16 then submits the query to Q_provider (e.g., 32) queries database 24 and the output sent back to application 12 is a record set containing ProductId={3}.

Inserting (170, 172, and 174), included in process 150, are defined by insert operations on aspects A_OrderHeader, A_Basket, and A_Position, respectively.

Querying (178), included in process 150, Orders database table (Table 12) by customer is described by the QueryByCustomer query associated with service module S_Order defined in Table 18. For example, front end application program 12 can submit query QueryByCustomer associated with service module S_Order with Customer_Key (CustomerId)={2} and no filtering OrderHeader_Key. Service manager 16 checks repository 18 to ensure that the query is defined. Service manager 16 then submits the query to Q_provider (e.g., 32) that queries database 24 and the output is sent back to application 12 is a record set containing OrderHeader_Key (OrderId)={2, 3}.

Selecting (180), included in process 150, order operation on Orders database table (Table 12) and setting (182) submitted field to true on selected orders are defined by the Execute Submit action (defined in Table 14) on aspect A_OrderHeader in repository 18. For example, front end application program 12 sends the Submit action on aspect A_OrderHeader to service manager 16 with OrderHeader_Key={2, 3}. Service manager 16 then sends the submit operation to S_provider (e.g., 34) that changes the Submitted field in Orders database table (Table 12) to "True" for selected rows corresponding to OrderId={2, 3}.

Getting (184) customer address, included in process 150, from Addresses database table (Table 8) is defined by the standard Select By Relation action on A_Customer aspect. For example, the front end application program 12 sends a Select By Relation action on A_Customer aspect specifying relation R_Customer_To_Address and Customer_Key={2} to service manager 16. Service manager 16 checks the request against repository 18 and passes the request to service provider S_provider (e.g., 34) that looks up foreign key AddressId matching CustomerId={2} and navigates to Addresses table 8. S_provider (e.g., 34) returns a record set containing {Louisville, Willow Avenue} from Addresses database table (Table 8) to application 12 via service manager 16.

The techniques described above can be implemented in digital electronic circuitry, or in computer hardware, firmware, software, or in combinations of them. The techniques also can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). The method steps may also be performed in other orders than those described above.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components.

The invention has been described in terms of particular embodiments. Other embodiments are within the scope of the following claims.

What is claimed is:

1. A computer-readable storage device comprising instructions which, when executed by a processor, perform a method for providing services to a consumer software component from a provider software component, the method comprising:
   receiving a software service request in the consumer software component of a database system in response to a service request from a user;
   intercepting the software service request from the consumer software component in a service manager acting as an intermediary between the consumer software component and the provider software component, the service manager having an interface to allow the consumer software component to retrieve a set of data from a database;
   identifying, based on the software service request and semantic descriptions of at least one object in a repository, the requested service to be performed by the provider software component in the service manager by deriving a manifest of methods from the repository, the manifest containing a set of semantic descriptions of at least one object in the database;
   matching the software service request with the semantic description of one or more methods contained in the manifest of methods and the at least one object in the repository;
   combining the results of the match;
   determining a locking mode for the set of data accessed by the service manager while performing the service, wherein the locking mode may be determined to be one of an exclusive lock, a shared lock, or a shared lock that may be upgraded to an exclusive lock;
   locking the set of data based on the determined locking mode;
   executing the at least one method from the manifest of methods based on the combination of the results of the match with the software service request using the service manager and the locked set of data; and
   performing the user requested service using the set of data.

2. The computer-readable storage device of claim 1, wherein the repository contains descriptions of objects that are contained in the database.

3. The computer-readable storage device of claim 1, wherein the method further comprises:
   tracing execution of the one or more services.

4. The computer-readable storage device of claim 1, wherein the method further comprises:
   collecting one or more messages sent by the one or more methods provided by the object in the provider software component during execution.

5. The computer-readable storage device of claim 1, wherein the method further comprises:
   preventing a second service from executing for a second consumer software component until a transaction with the consumer software component is completed, and
   determining the locking mode based on capabilities of a target system.

6. The computer-readable storage device of claim 1, wherein the method further comprises:
   interfacing to the consumer software component using a proxy component; and
   interfacing to the provider software component using a backend component.

7. A method for providing services to a consumer software component from a provider software component, the method comprising:
   receiving a software service request from in a consumer software component of a database system in response to a service request from a user;
   intercepting the software service request from the consumer software component in a service manager acting as an intermediary between the provider software component, the service manager having an interface to allow the consumer software component to retrieve a set of data from a database;
   identifying, based on the software service request and semantic descriptions of at least one object in a repository, the user requested service to be performed by the provider software component in the service manager by deriving a manifest of methods from a repository, the manifest containing a set of semantic descriptions of the at least one object in the database;
   matching the software service request with the semantic description of one or more methods contained in the manifest of methods and the at least one object in the repository;
   determining a locking mode for the set of data accessed by the service manager while performing the service, wherein the locking mode may be determined to be one of an exclusive lock, a shared lock, or a shared lock that may be upgraded to an exclusive lock;
   locking the set of data based on the determined locking mode;
   executing the at least one method from the manifest of methods based on the combination of the results of the match with the software service request using the service manager and the locked set of data; and
   performing the user requested service using the set of data.

8. The method of claim 7, wherein the repository contains descriptions of objects that are contained in the database.

9. The method of claim 7, further comprising:
   tracing execution of the one or more services.

10. The method of claim 7, further comprising:
    collecting one or more messages sent by the one or more methods provided by the object in the provider software component during execution.

11. The method of claim 7, further comprising:

preventing a second service from executing for a second consumer software component until a transaction with the consumer software component is completed; and determining the locking mode based on capabilities of a target system.

12. A system comprising:

a first computer configured to execute a client program;

a second computer configured to execute a server program;

a database accessible by the first computer and the second computer;

a network linking the first and second computers, wherein the server program:

receives a software service request from the client program for a service from the server program in response to a software service request from a user;

intercepts the software service request from the client program in a service manager acting as an intermediary between the client program and the server program, the service manager having an interface to allow the client program to retrieve a set of data from the database;

identifies, based on the software service request and semantic descriptions of at least one object in a data repository, the user requested service to be performed by the server program in the service manager by deriving a manifest of methods from a repository, the manifest containing a set of semantic descriptions of the at least one object in the database;

matches the software service request with the semantic description of the one or more methods contained in the manifest of methods and the at least one object in the repository;

determines a locking mode for a the set of data accessed by the service manager while performing the service, wherein the locking mode may be determined to be an exclusive lock, a shared lock, or a shared lock that may be upgraded to an exclusive lock;

locks the set of data based on the determined locking mode;

executing the at least one method from the manifest of methods based on the combination of the results of the match with the software service request using the service manager and the locked set of data; and performs the user requested service using the set of data.

13. The system of claim 12, wherein the repository contains descriptions of objects that are contained in the database.

14. The system of claim 12, wherein the server program:

traces execution of the one or more services.

15. The system of claim 12, wherein the server program:

collects one or more messages sent by the one or more methods provided by the object in the server program during execution.

16. The system of claim 12, wherein the server program:

prevents a second service from executing for a second client program until a transaction with the client program is completed; and determines the locking mode based on capabilities of a target system.

* * * * *